United States Patent
Qi et al.

(10) Patent No.: US 12,365,412 B2
(45) Date of Patent: Jul. 22, 2025

(54) BATTERY COMPARTMENT, BATTERY COMPARTMENT ASSEMBLY AND ELECTRIC SCOOTER

(71) Applicant: NINEBOT (CHANGZHOU) TECH CO., LTD., Changzhou (CN)

(72) Inventors: Zefang Qi, Changzhou (CN); Hui Su, Changzhou (CN)

(73) Assignee: NINEBOT (CHANGZHOU) TECH CO., LTD., Changzhou (CN)

( * ) Notice: Subject to any disclaimer, the term of this patent is extended or adjusted under 35 U.S.C. 154(b) by 850 days.

(21) Appl. No.: 17/584,602

(22) Filed: Jan. 26, 2022

(65) Prior Publication Data

US 2022/0234671 A1 Jul. 28, 2022

(30) Foreign Application Priority Data

Jan. 27, 2021 (CN) .......................... 202120236382.3

(51) Int. Cl.
- *B62J 43/28* (2020.01)
- *B62J 43/10* (2020.01)
- *B62J 43/13* (2020.01)
- *B62K 11/02* (2006.01)

(52) U.S. Cl.
CPC ............... *B62J 43/28* (2020.02); *B62J 43/13* (2020.02); *B62K 11/02* (2013.01); *B62K 2202/00* (2013.01)

(58) Field of Classification Search
CPC . B62J 43/28; B62J 43/13; B62J 43/10; B62K 19/30; B62K 11/02; B62K 3/002; B62K 2202/00
USPC .................................................. 180/180, 181
See application file for complete search history.

(56) References Cited

U.S. PATENT DOCUMENTS

| | | | |
|---|---|---|---|
| 11,370,319 B2 | 6/2022 | Treadway et al. | |
| 2001/0011202 A1* | 8/2001 | Yamawaki | B62K 3/002 701/93 |
| 2002/0170763 A1* | 11/2002 | Townsend | B60L 15/20 180/220 |
| 2006/0266570 A1* | 11/2006 | Roth | B62K 3/002 180/208 |

(Continued)

FOREIGN PATENT DOCUMENTS

| | | |
|---|---|---|
| CN | 203473137 U | 3/2014 |
| CN | 104210592 B | 8/2016 |

(Continued)

OTHER PUBLICATIONS

Extended European Search Report dated Jun. 22, 2022 for Application No. 22151315.3, 8 pages.

(Continued)

*Primary Examiner* — Anne Marie M Boehler
(74) *Attorney, Agent, or Firm* — Frost Brown Todd LLP

(57) ABSTRACT

A battery compartment, a battery compartment assembly and an electric scooter are provided. The battery compartment is used for an electric scooter, and includes a compartment body and a limiting flange. The electric scooter includes a frame with an opening, and the opening runs through the frame in an up-down direction. The compartment body is configured to penetrate through the opening, and the limiting flange is arranged to an outer side wall of the compartment body and configured to abut against the frame to prevent the compartment body from falling out of the opening downwards.

14 Claims, 3 Drawing Sheets

(56) References Cited

U.S. PATENT DOCUMENTS

| | | | |
|---|---|---|---|
| 2016/0256767 A1* | 9/2016 | Cerboneschi | A63C 17/12 |
| 2016/0296826 A1* | 10/2016 | Belcher | A63C 17/12 |
| 2019/0061863 A1* | 2/2019 | Lee | B62M 6/90 |
| 2020/0231240 A1* | 7/2020 | Allen | B62K 23/06 |
| 2020/0283086 A1* | 9/2020 | Ulmen | B62M 6/65 |
| 2022/0234674 A1 | 7/2022 | Qi et al. | |
| 2022/0234678 A1* | 7/2022 | Chai | B62K 3/002 |
| 2023/0042566 A1* | 2/2023 | Sun | H01M 10/625 |
| 2023/0128613 A1* | 4/2023 | Lee | B62J 43/10 |
| | | | 180/220 |

FOREIGN PATENT DOCUMENTS

| | | | | |
|---|---|---|---|---|
| CN | 209479867 U | | 10/2019 | |
| CN | 209535333 U | | 10/2019 | |
| CN | 210338181 U | | 4/2020 | |
| CN | 210592288 U | | 5/2020 | |
| DE | 202021104432 U1 * | 10/2021 | ............. | B62J 43/20 |
| EP | 1000845 A2 | | 5/2000 | |

OTHER PUBLICATIONS

Extended European Search Report dated Jun. 28, 2022 for Application No. 22152058.8, 8 pages.

* cited by examiner

BATTERY COMPARTMENT, BATTERY COMPARTMENT ASSEMBLY AND ELECTRIC SCOOTER

CROSS-REFERENCE TO RELATED APPLICATION

This application claims the benefit of priority to Chinese patent Application No. 202120236382.3, filed on Jan. 27, 2021, the content of which is incorporated herein by reference in its entirety.

FIELD

The present disclosure relates to a field of battery technologies, and in particular to a battery compartment, a battery compartment assembly and an electric scooter.

BACKGROUND

Generally, a battery compartment of a scooter is horizontally mounted in the middle of a frame, and a top plate of the battery compartment forms a deck area. The battery compartment is complexly mounted to the frame in the related art, and the connection between the battery compartment and the frame has a low strength. When a top of the battery compartment is subjected to an overlarge impact force from a rider, the connection between the battery compartment and the frame tends to loose, and even the battery compartment falls out of an opening of the frame.

SUMMARY

Embodiments of an aspect of the present disclosure provide a battery compartment.

Embodiments of another aspect of the present disclosure also provide a battery compartment assembly.

Embodiments of still another aspect of the present disclosure further provide an electric scooter.

The battery compartment according to the embodiments of the present disclosure is used for an electric scooter, and includes a compartment body and a limiting flange. The electric scooter includes a frame with an opening, and the opening runs through the frame in an up-down direction. The compartment body is configured to penetrate through the opening, and the limiting flange is arranged to an outer side wall of the compartment body and configured to abut against the frame to prevent the compartment body from falling out of the opening downwards.

The battery compartment assembly according to the embodiments of the present disclosure includes an end cover and a battery compartment for an electric scooter. The battery compartment includes a compartment body and a limiting flange. The electric scooter includes a frame with an opening, and the opening runs through the frame in an up-down direction. The compartment body is configured to penetrate through the opening, and the limiting flange is arranged to an outer side wall of the compartment body and configured to abut against the frame to prevent the compartment body from falling out of the opening downwards. The compartment body defines a accommodating cavity, and has an aperture configured to communicate the outside with the accommodating cavity, the end cover is connected with the compartment body to close the aperture, and at least a part of the end cover abuts against the frame to prevent the battery compartment from falling out of the opening downwards.

The electric scooter according to the embodiments of the present disclosure includes a frame and a battery compartment assembly detachably connected with the frame. The frame has an opening running through the frame in an up-down direction. The battery compartment assembly includes a battery compartment and an end cover. The battery compartment includes a compartment body and a limiting flange. The compartment body is configured to penetrate through the opening. The limiting flange is arranged to an outer side wall of the compartment body and configured to abut against the frame to prevent the compartment body from falling out of the opening downwards. The compartment body defines an accommodating cavity, and has an aperture configured to communicate the outside with the accommodating cavity, the end cover is connected with the compartment body to close the aperture, and at least a part of the end cover abuts against the frame to prevent the battery compartment from falling out of the opening downwards.

It is to be understood that both the foregoing general description and the following detailed description are illustrative and explanatory only and are not restrictive of the present disclosure, as claimed.

DETAILED DESCRIPTION

Figure 1:
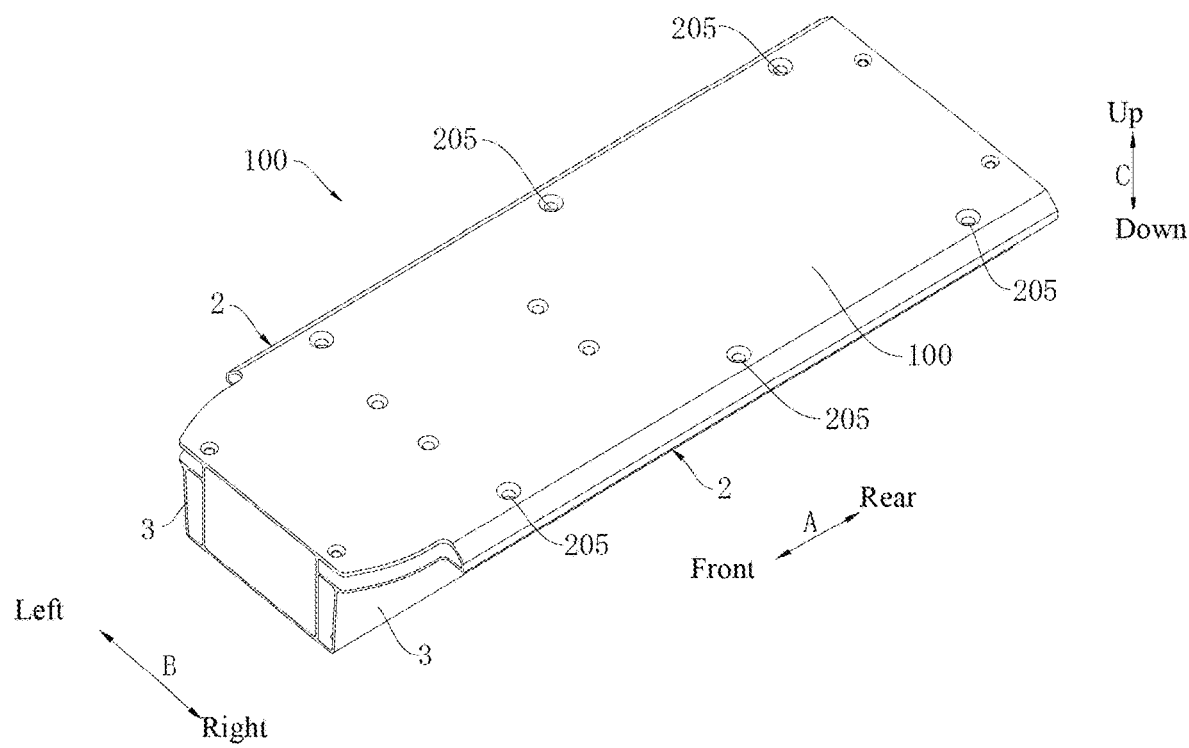
FIG. 1 is a schematic view of a battery compartment for an electric scooter according to embodiments of the present disclosure.

Reference will be made in detail to embodiments of the present disclosure, and the examples of the embodiments are illustrated in the drawings. The embodiments described herein with reference to drawings are illustrative, and intended to explain the present disclosure. The embodiments shall not be construed to limit the present disclosure.

A battery compartment 100 for an electric scooter 1000 according to embodiments of the present disclosure is described below with reference to FIGS. 1 to 5.

As illustrated in FIGS. 1 to 5, the battery compartment 100 for the electric scooter 1000 according to the embodiments of the present disclosure includes a compartment body 1 and a limiting flange 2. The electric scooter 1000 includes a frame 5 with an opening 501, and the opening 501 runs through the frame 5 in an up-down direction. The compartment body 1 is configured to penetrate through the opening 501. The limiting flange 2 is arranged to an outer side wall of the compartment body 1, and configured to abut against the frame 5 to prevent the compartment body 1 from falling out of the opening 501 downwards.

In the battery compartment 100 for the electric scooter 1000 according to the embodiments of the present disclosure, the limiting flange 2 is arranged to the outer side wall of the compartment body 1, and the compartment body 1 is placed into the opening 501 of the frame 5 from top to bottom until the limiting flange 2 abuts against the frame 5, thus realizing a lap joint of the battery compartment 100 for the electric scooter 1000 at the opening 501 of the frame 5. Thus, an upward force acted on the limiting flange 2 by the frame 5 may offset an impact force acted on the compartment body 1 by a rider, and the joint between the battery compartment 100 for the electric scooter 1000 and the frame 5 is basically not required to bear the impact force acted on the compartment body 1 by the rider, such that the battery compartment 100 for the electric scooter 1000 can be easily and conveniently mounted to the frame 5, and the joint between the battery compartment 100 for the electric scooter 1000 and the frame 5 has good stability.

Figure 2:
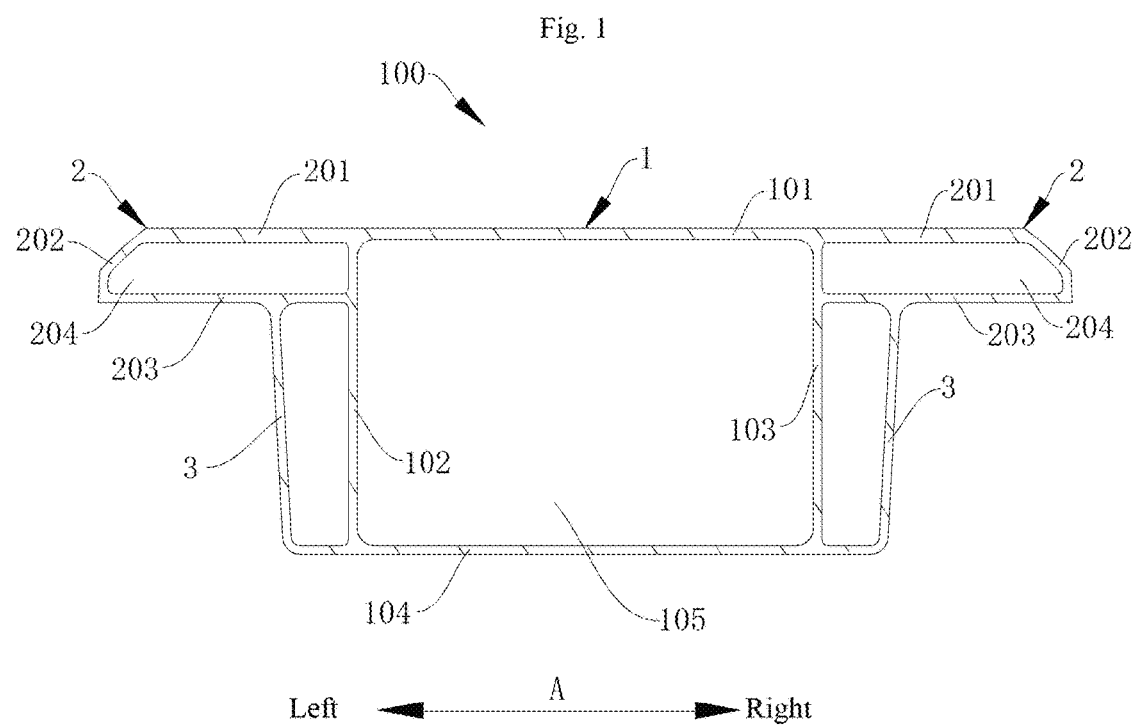
FIG. 2 is a sectional view of a battery compartment for an electric scooter according to embodiments of the present disclosure.

For easy understanding, an arrow A in FIGS. 1 and 2 indicates a front-rear direction of the battery compartment 100 for the electric scooter 1000, an arrow Bin FIG. 1 indicates a left-right direction of the battery compartment 100 for the electric scooter 1000, and an arrow C in FIG. 1 indicates the up-down direction of the battery compartment 100 for the electric scooter 1000.

In some embodiments, the limiting flange 2 is provided with a connecting hole 205 running through the limiting flange 2 in the up-down direction. The frame 5 is provided with a threaded hole 504, and the limiting flange 2 is connected with the frame 5 by a threaded part which penetrates through the connecting hole 205 and is threadedly fitted in the threaded hole 504.

Figure 3:
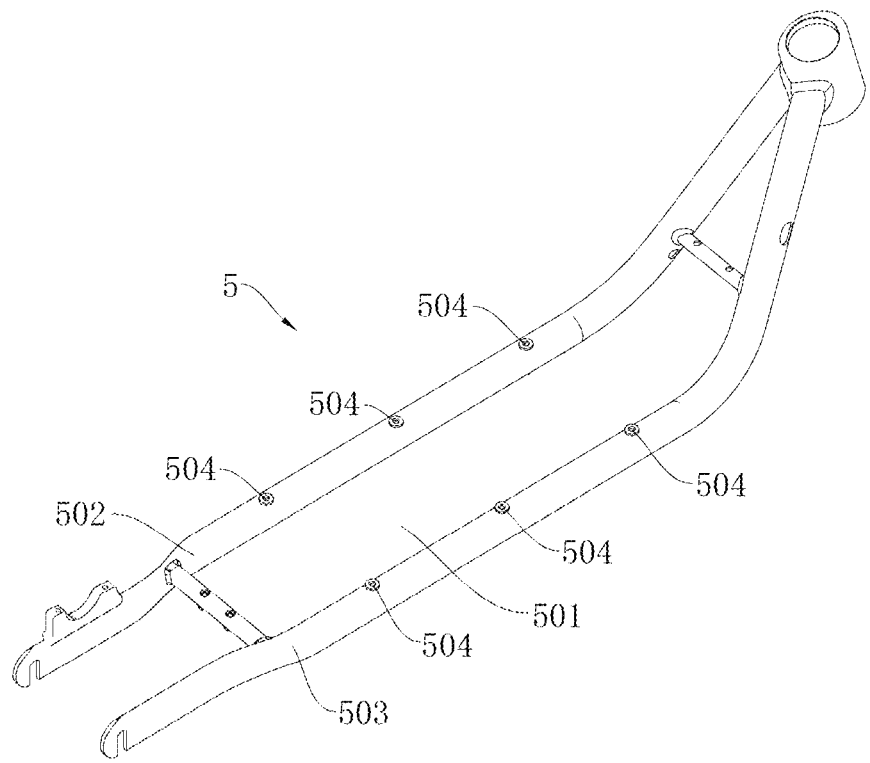
FIG. 3 is a schematic view of a frame in an electric scooter according to embodiments of the present disclosure.

As illustrated in FIGS. 1 and 3, the threaded part is configured as a bolt, a plurality of the connecting holes 205 and a plurality of the threaded holes 504 are provided, the plurality of the connecting holes 205 are in one-to-one correspondence to the plurality of the threaded holes 504, and the plurality of the connecting holes 205 are arranged at intervals in a circumferential direction of the compartment body 1. The connecting hole 205 and the threaded hole 504 have axes in the up-down direction. After the battery compartment 100 for the electric scooter 1000 is lapped at the opening 501, a relative position between the battery compartment 100 for the electric scooter 1000 and the frame 5 is adjusted, such that the axis of the connecting hole 205 coincides with the axis of the corresponding threaded hole 504, and the bolt penetrates through the connecting hole 205 from top to bottom and is threadedly fitted in the corresponding threaded hole 504, thereby realizing the connection between the battery compartment 100 for the electric scooter 1000 and the frame 5. Thus, the battery compartment 100 for the electric scooter 1000 and the frame 5 are guaranteed to be fixed relative to each other, and the battery compartment 100 for the electric scooter 1000 is conveniently connected with the frame 5.

In some embodiments, the limiting flange 2 includes a first limiting plate 201, a second limiting plate 202 and a third limiting plate 203 connected in sequence. The first and third limiting plates 201, 203 are spaced apart in the up-down direction, and both are connected with the outer side wall of the compartment body 1. The first, second and third limit plates 201, 202, 203 as well as the compartment body 1 enclose a first accommodation cavity 204.

As illustrated in FIG. 2, a cross section of the limiting flange 2 has a U shape with an opening facing the horizontal direction, the first and third limiting plates 201, 203 are parallel to each other, the first limiting plate 201 is located above the third limiting plate 203, and the first accommodating cavity 204 extends in the front-rear direction.

When the battery compartment 100 for the electric scooter 1000 is lapped at the opening 501 of the frame 5, the third limiting plate 203 abuts against the frame 5. The second limiting plate 202 is connected with the first and third limiting plates 201, 203, and thus, the first and third limiting plates 201, 203 jointly support the battery compartment 100 for the electric scooter 1000. Moreover, since free ends of the first and third limiting plates 201, 203 are both connected with the outer side wall of the compartment body 1, the limiting flange 2 and the compartment body 1 have higher connection strength, and thus, the joint between the limiting flange 2 and the compartment body 1 can bear a larger impact force, such that the battery compartment 100 for the electric scooter 1000 is mounted at the frame 5 with higher stability.

In some embodiments, the outer side wall of the compartment body 1 is provided with a reinforcing rib 3 having an upper end connected with the limiting flange 2.

As illustrated in FIG. 2, a lower end of the reinforcing rib 3 is connected with a part of the outer side wall of the compartment body 1 adjacent to a bottom wall of the compartment body 1. the upper end of the reinforcing rib 3 is connected with a center of the third limiting plate 203, and the reinforcing rib 3 extends in the front-rear direction of the compartment body 1. Thus, a pulling force may be given to the limiting flange 2 by the reinforcing rib 3, so as to effectively prevent the limiting flange 2 from being deformed and bent upwards relative to the compartment body 1 when the battery compartment 100 for the electric scooter 1000 bears the impact force of the rider, which further guarantees the stability of the joint between the limiting flange 2 and the compartment body 1, and further prolongs the service life of the battery compartment 100 for the electric scooter 1000. Moreover, when the battery compartment 100 for the electric scooter 1000 is lapped at the opening 501 of the frame 5, the reinforcing rib 3 abuts against a side edge of the opening 501 to achieve a relative fixing between the battery compartment 100 for the electric scooter 1000 and the frame 5 in the horizontal direction.

In some embodiments, the compartment body 1, the limiting flange 2 and the reinforcing rib 3 are integrally formed.

Thus, the compartment body 1 and the limiting flange 2 have higher connection strength, and the reinforcing rib 3 more effectively limits the limiting flange 2, so as to further prolong the service fife of the battery compartment 100 for the electric scooter 1000.

In some embodiments, the compartment body 1 has a second accommodating cavity 105, and including a top plate 101, a first side plate 102, a second side plate 103 and a bottom plate 104. The top plate 101, the first and second side plates 102, 103 as well as the bottom plate 104 enclose the second accommodating cavity 105, and at least one limiting flange 2 is arranged to each of outer side walls of the first and second side plates 102, 103.

As illustrated in FIGS. 1-5, the second accommodating cavity 105 has a first aperture and a second aperture in the front-rear direction, the first side plate 102 serves as a left side plate of the compartment body 1, and the second side plate 103 serves as a right side plate of the compartment body 1. Each of the outer side walls of the left and right side plates is provided with one limiting flange 2, and the size of the left side plate in the front-rear direction is equal to the size of the right side plate in the front-rear direction and the sizes of the two limiting flanges 2 in the front-rear direction. Thus, the battery compartment 100 for the electric scooter 1000 can be stably lapped at the opening 501 of the frame 5 with the two limiting flanges 2 abutting against the frame 5.

It should be noted that, in this case, the limiting flange 2 and the reinforcing rib 3 both extend in the front-rear direction, and the first and second accommodating cavities 204, 105 both extend in the front-rear direction.

In some embodiments, the frame 5 includes a first connecting tube 502 and a second connecting tube 503, and at least a part of the first connecting tube 502 and at least a part of the second connecting tube 503 are spaced apart in the left-right direction. The opening 501 is defined between the at least parts of the first and second connecting tubes 502, 503, and the first and second side plates 102, 103 are spaced apart in the left-right direction. The limiting flange 2 at the first side plate 102 abuts against the first connecting tube 502, and the limiting flange 2 at the second side plate 103 abuts against the second connecting tube 503.

Figure 4:
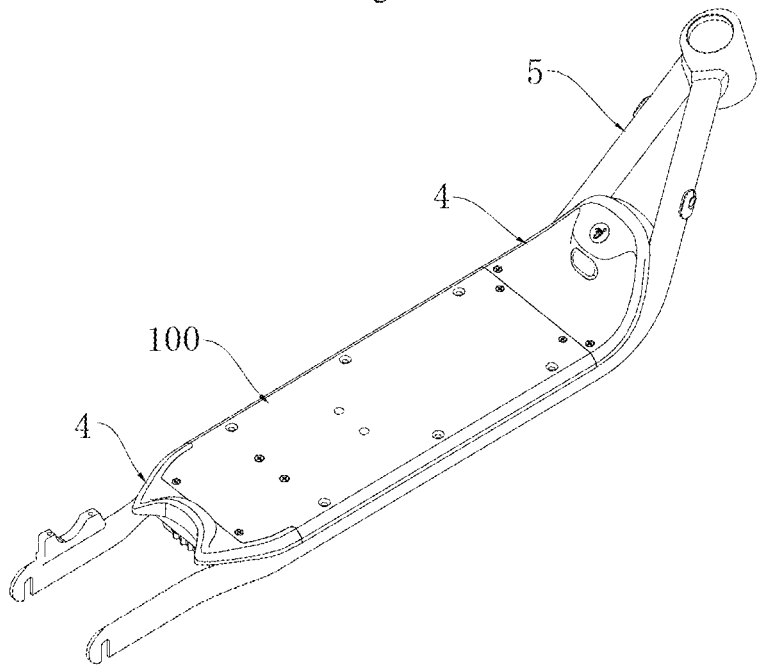
FIG. 4 is a schematic view of a frame in an electric scooter and a battery compartment for an electric scooter according to embodiments of the present disclosure.

As illustrated in FIGS. 3 and 4, middle parts of the first and second connecting tubes 502, 503 are arranged in parallel with each other and spaced apart in the left-right direction, and the first connecting tube is located on the left side of the second connecting tube 503. The opening 501 is defined between the middle parts of the first and second connecting tubes 502, 503. After the battery compartment 100 for the electric scooter 1000 is lapped at the opening 501 of the frame 5, the third limiting plate 203 of the limiting flange 2 arranged to the first side plate 102 abuts against an upper wall surface of the first connecting tube 502, and the third limiting plate 203 of the limiting flange 2 arranged to the second side plate 103 abuts against an upper wall surface of the second connecting tube 503.

Each of the limiting flanges 2 at the first and second side plates 102, 103 is provided with three connecting holes 205 spaced apart in the front-rear direction, and each of the first and second connecting tubes 502, 503 is provided with three threaded holes 504 spaced apart in the front-rear direction. The three connecting holes 205 in the limiting flange 2 at the first side plate 102 are in one-to-one correspondence to the three threaded holes 504 in the first connecting tube 502, and the three connecting holes 205 in the limiting flange 2 at the second side plate 103 are in one-to-one correspondence to the three threaded holes 504 in the second connecting tube 503.

In some embodiments, the top plate 101 and the limiting flange 2 have coplanar upper surfaces.

As illustrated in FIGS. 1, 2 and 4, the upper surface of the top plate 101 and upper surfaces of the two first limiting plates 201 of the two limiting flanges 2 are located in the same horizontal plane. Thus, the top plate 101 and the two first limiting plates 201 jointly constitute a deck region with a larger area, and hence the scooter has better riding comfort. Moreover, the limiting flange 2 may directly bear the impact force of the rider to reduce the impact force acted on the compartment body 1 from the rider, such that the impact force acted on the joint between the limiting flange 2 and the compartment body 1 is reduced, and the battery compartment 100 for the electric scooter 1000 has stronger structural stability and a longer service life.

A battery compartment 100 for an electric scooter 1000 according to a specific example of the embodiments of the present disclosure is described below with reference to FIGS. 1 to 5.

As illustrated in FIGS. 1 to 5, the battery compartment 100 for the electric scooter 1000 according to the embodiments of the present disclosure includes a compartment body 1, a limiting flange 2 and a reinforcing rib 3 which are integrally formed.

The compartment body 1 includes a top plate 101, a first side plate 102, a second side plate 103 and a bottom plate 104, and the top plate 101, the first and second side plates 102, 103 as well as the bottom plate 104 enclose a second accommodating cavity 105 running through the compartment body 1 in the front-rear direction. The first side plate 102 is located on the left side of the second side plate 103.

Two limiting flanges 2 are provided, each of the two limiting flanges 2 includes a first limiting plate 201, a second limiting plate 202 and a third limiting plate 203 connected in sequence, the first limiting plate 201 is located above the second limiting plate 202, and the first and second limiting plates 201, 202 are spaced apart in the up-down direction. Free ends of the first and third limiting plates 201, 203 of one limiting flange 2 are connected with an outer side waft of the first side plate 102, and the first limiting plate 201 of the one limiting flange 2 and the top plate 101 have coplanar upper surfaces. Free ends of the first and third limiting plates 201, 203 of the other limiting flange 2 are connected with an outer side wall of the second side plate 103, and the first limiting plate 201 of the other limiting flange 2 and the top plate 101 have coplanar upper surfaces.

Each limiting flange 2 is provided with three connecting holes 205 which are spaced apart in the front-rear direction and run through the first and third limiting plates 201, 203 in the up-down direction.

Two reinforcing ribs 3 are provided, and the sizes of the two reinforcing ribs 3 in the front-rear direction are equal to the size of the compartment body 1 in the front-rear direction. One reinforcing rib 3 is located on the left side of the first side plate 102, and has a lower end connected with a lower end of the first side plate 102, and an upper end connected with the third limiting plate 203 of the limiting flange 2 which is also located on the left side of the first side plate 102. The other reinforcing rib 3 is located on the right side of the second side plate 103, and has a lower end connected with a lower end of the second side plate 103, and an upper end connected with the third limiting plate 203 of the limiting flange 2 which is also located on the right side of the second side plate 103.

A battery compartment assembly according to embodiments of the present disclosure includes an end cover 4 and the above battery compartment 100 for the electric scooter 1000. The battery compartment 100 for the electric scooter 1000, specifically the compartment body 1, defines a second accommodating cavity 105, the compartment body 1 has an aperture configured to communicate the outside with the second accommodating cavity 105, and the end cover 4 is connected with the compartment body 1 to close the aperture. At least a part of the end cover 4 abuts against the frame 5 to prevent the battery compartment 100 for the electric scooter 1000 from falling out of the opening 501 downwards.

In the battery compartment assembly according to the embodiments of the present disclosure, the limiting flange 2 is arranged to the outer side wall of the compartment body 1 and abuts against the frame 5. Thus, an upward force acted on the limiting flange 2 by the frame 5 may offset an impact force acted on the compartment body 1 by a rider, and the joint between the battery compartment 100 for the electric scooter 1000 and the frame 5 is basically not required to bear the impact force acted on the compartment body 1 by the rider, such that the battery compartment 100 for the electric scooter 1000 can be easily and conveniently mounted to the frame 5, and the joint between the battery compartment 100 for the electric scooter 1000 and the frame 5 has good stability.

Moreover, as illustrated in FIG. 4, two apertures are oppositely provided in the front-rear direction, and two end covers 4 are provided in one-to-one correspondence to the two apertures. Each of the two end covers 4 has protrusions extending leftwards and rightwards respectively, and after the battery compartment 100 for the electric scooter 1000 is mounted to the frame 5, the protrusions on the left and right sides of the end cover 4 also abut against the frame 5. Thus, the battery compartment 100 for the electric scooter 1000 is better supported, and the stability of the joint between the battery compartment 100 for the electric scooter 1000 and the frame 5 is further improved.

Figure 5:
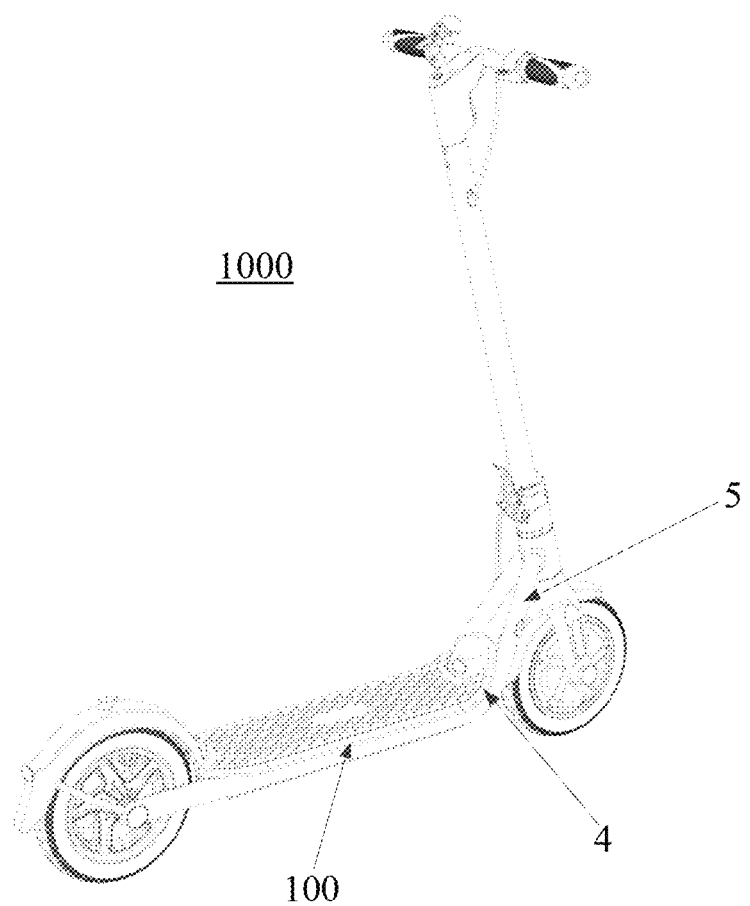
FIG. 5 is a schematic view of an electric scooter according to embodiments of the present disclosure.

As shown in FIG. 5, an electric scooter 1000 according to embodiments of the present disclosure includes a frame 5 and the above battery compartment assembly detachably connected with the frame 5.

The electric scooter 1000 according to the embodiments of the present disclosure has the same technical advantages as the above battery compartment 100 for the electric scooter 1000 and the above battery compartment assembly, which are not repeated herein.

In some embodiments, the electric scooter 1000 is configured as a scooter. Certainly, the present disclosure is not limited thereto, and the electric scooter 1000 may also be configured as an electric motorcycle, a self-balancing scooter, or the like.

In the descriptions of the present disclosure, it is to be understood that terms such as "center", "longitudinal", "transverse", "length", "width", "thickness", "upper", "lower", "front", "rear", "left", "right", "vertical", "horizontal", "top". "bottom", "inner", "outer", "clockwise", "anticlockwise", "axial", "radial", and "circumferential" should be construed to refer to the orientation as illustrated in the drawings. These relative terms are for convenience of descriptions and do not indicate or imply that the present disclosure be constructed or operated in a particular orientation, thus cannot be construed to limit the present disclosure.

In addition, the terms such as "first" and "second" are used herein for purposes of descriptions and are not intended to indicate or imply relative importance or significance or to imply the number of indicated technical features. Thus, the feature defined with "first" and "second" may include at least one of this feature explicitly or implicitly. In the descriptions of the present disclosure, "a plurality of" means at least two, for example, two, three, or the like, unless specifically limited otherwise.

In the present disclosure, unless specified or limited otherwise, the terms "mounted", "connected", "coupled", and "fixed" and the like are used broadly, and may be, for example, fixed connections, detachable connections, or integral connections; may also be mechanical or electrical connections or communication with each other; may also be direct connections or indirect connections via intervening structures; may also be a communication or an interaction relationship of two elements. The above terms can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, terms "an embodiment", "some embodiments", "example", "specific example" or "some examples" means that a particular feature, structure, material, or characteristic described in connection with the embodiment or example is included in at least one embodiment or example of the present disclosure. In the specification, the schematic expressions to the above terms do not necessarily refer to the same embodiment or example. Furthermore, the described particular features, structures, materials, or characteristics may be combined in any suitable manner in one or more embodiments or examples. Furthermore, those skilled in the art may combine different embodiments or examples and features in different embodiments or examples described in the specification, without mutual contradictions.

Although embodiments of the present disclosure have been illustrated and illustrated, it shall be understood that the above embodiments are exemplary and not construed as limitations to the present disclosure. Various changes, modifications, alternatives and variants within the scope of the present disclosure may be made by those skilled in the art.

What is claimed is:

1. A battery compartment for an electric scooter, the electric scooter comprising a frame with an opening, the opening running through the frame in an up-down direction, and the battery compartment comprising:
   a compartment body configured to penetrate through the opening; and
   a limiting flange connected to an outer side wall of the compartment body and configured to abut against the frame to prevent the compartment body from falling out of the opening downwards;
   wherein the limiting flange comprises a first limiting plate, a second limiting plate and a third limiting plate connected in sequence, the first and third limiting plates are spaced apart in the up-down direction and both connected with the outer side wall of the compartment body, and the first, second and third limiting plates as well as the compartment body enclose a first accommodating cavity;
   wherein the outer side wall of the compartment body is provided with a reinforcing rib having an upper end connected with the limiting flange,
   wherein the reinforcing rib further has a lower end connected with a part of the outer side wall of the compartment body adjacent to a bottom wall of the compartment body;
   wherein the upper end is connected with a center of the third limiting plate.

2. The battery compartment according to claim 1, wherein the limiting flange has a connecting hole running through the limiting flange in the up-down direction, the frame has a threaded hole, and the limiting flange is configured to be connected with the frame by a threaded part penetrating through the connecting hole and threadedly fitted in the threaded hole.

3. The battery compartment according to claim 1, wherein the compartment body, the limiting flange and the reinforcing rib are integrally formed.

4. The battery compartment according to claim 1, wherein the compartment body has a second accommodating cavity, and comprises a top plate, a first side plate, a second side plate and a bottom plate, the top plate, the first and second side plates as well as the bottom plate enclose the second accommodating cavity, and at least one limiting flange is arranged to each of outer side walls of the first and second side plates.

5. The battery compartment according to claim 4, wherein the frame comprises a first connecting tube and a second connecting tube, at least a part of the first connecting tube and at least a part of the second connecting tube are spaced apart in a left-right direction, the opening is defined between the at least parts of the first and second connecting tubes, the first and second side plates are spaced apart in the left-right direction, the limiting flange at the first side plate abuts against the first connecting tube, and the limiting flange at the second side plate abuts against the second connecting tube.

6. The battery compartment according to claim 4, wherein the top plate and the limiting flange have coplanar upper surfaces.

7. A battery compartment assembly, comprising:
a battery compartment for an electric scooter, the electric scooter comprising a frame with an opening, the opening running through the frame in an up-down direction, and the battery compartment for the electric scooter comprising:
  a compartment body configured to penetrate through the opening; and
  a limiting flange connected to an outer side wall of the compartment body and configured to abut against the frame to prevent the compartment body from falling out of the opening downwards; wherein the limiting flange comprises a first limiting plate, a second limiting plate and a third limiting plate connected in sequence, the first and third limiting plates are spaced apart in the up-down direction and both connected with the outer side wall of the compartment body, and the first, second and third limiting plates as well as the compartment body enclose a first accommodating cavity; wherein the outer side wall of the compartment body is provided with a reinforcing rib having an upper end connected with the limiting flange, wherein the reinforcing rib further has a lower end connected with a part of the outer side wall of the compartment body adjacent to a bottom wall of the compartment body; wherein the upper end is connected with a center of the third limiting plate; and
an end cover,
wherein the compartment body defines an accommodating cavity, and has an aperture configured to communicate the outside with the accommodating cavity, the end cover is connected with the compartment body to close the aperture, and at least a part of the end cover abuts against the frame to prevent the battery compartment from falling out of the opening downwards.

8. The battery compartment assembly according to claim 7, wherein the end cover has a protrusion on either side in a left-right direction, and the protrusion of the end cover abuts against the frame to prevent the battery compartment from falling out of the opening downwards.

9. An electric scooter, comprising:
a frame having an opening running through the frame in an up-down direction; and
a battery compartment assembly detachably connected with the frame, and comprising:
  a battery compartment comprising:
    a compartment body configured to penetrate through the opening; and
    a limiting flange connected to an outer side wall of the compartment body and configured to abut against the frame to prevent the compartment body from falling out of the opening downwards; wherein the limiting flange comprises a first limiting plate, a second limiting plate and a third limiting plate connected in sequence, the first and third limiting plates are spaced apart in the up-down direction and both connected with the outer side wall of the compartment body, and the first, second and third limiting plates as well as the compartment body enclose a first accommodating cavity; wherein the outer side wall of the compartment body is provided with a reinforcing rib having an upper end connected with the limiting flange, wherein the reinforcing rib further has a lower end connected with a part of the outer side wall of the compartment body adjacent to a bottom wall of the compartment body; wherein the upper end is connected with a center of the third limiting plate; and
  an end cover,
  wherein the compartment body defines an accommodating cavity, and has an aperture configured to communicate the outside with the accommodating cavity, the end cover is connected with the compartment body to close the aperture, and at least a part of the end cover abuts against the frame to prevent the battery compartment from falling out of the opening downwards.

10. The electric scooter according to claim 9, wherein the limiting flange has a connecting hole running through the limiting flange in the up-down direction, the frame has a threaded hole, and the limiting flange is connected with the frame by a threaded part penetrating through the connecting hole and threadedly fitted in the threaded hole.

11. The electric scooter according to claim 9, wherein the compartment body, the limiting flange and the reinforcing rib are integrally formed.

12. The electric scooter according to claim 9, wherein the compartment body comprises a top plate, a first side plate, a second side plate and a bottom plate, the top plate, the first and second side plates as well as the bottom plate enclose the accommodating cavity of the compartment body, and at least one limiting flange is arranged to each of outer side walls of the first and second side plates.

13. The electric scooter according to claim 12, wherein the frame comprises a first connecting tube and a second connecting tube, at least a part of the first connecting tube and at least a part of the second connecting tube are spaced apart in a left-right direction, the opening is defined between the at least parts of the first and second connecting tubes, the first and second side plates are spaced apart in the left-right direction, the limiting flange at the first side plate abuts against the first connecting tube, and the limiting flange at the second side plate abuts against the second connecting tube.

14. The electric scooter according to claim 12, wherein the top plate and the limiting flange have coplanar upper surfaces.

* * * * *